United States Patent Office.

G. W. C. GAMBLE, OF MILLERSBURG, IOWA.

Letters Patent No. 74,680, dated February 18, 1868.

IMPROVED MEDICAL COMPOUND.

The Schedule referred to in these Letters Patent and making part of the same.

TO ALL WHOM IT MAY CONCERN:

Be it known that I, G. W. C. GAMBLE, of Millersburg, in the county of Iowa, and State of Iowa, have invented certain new and useful Improvements in a Medical Compound for the Cure of Cancer; and I do hereby declare that the following is a full, clear, and exact description thereof.

My improvement in compositions for curing cancer consists in the combination of the following ingredients, prepared in the manner hereinafter described:

Take ashes of red-oak bark, the bark being either in a green or dry state, in quantity, twenty pounds; the ashes of the root known as "bitter-sweet," with its bark either green or dry, five pounds; also, of green poke-root mashed fine, five pounds.

In preparing the compound, take a wooden vessel of suitable size, with perforations at bottom, being such as is used to run off common ash-lye. Into this vessel put about five pounds of the ashes of red-oak bark and of bitter-sweet, when mixed in the proportions above mentioned; then add five pounds of the mashed poke-root, with the remaining portion of the ashes of red-oak and bitter-sweet. To this mixture add sufficient water to moisten it without dripping. Let the mixture stand twenty-four hours. Then run it off by adding water until the strength of the ashes is exhausted. The extract will now be put in a metal vessel and boiled to the consistency of salve. The salve must now be put in bottles with ground-glass stoppers, and is ready for use.

Having thus described my invention, what I claim, and desire to secure by Letters Patent, is—

A cure for cancer, composed of the ingredients set forth, when prepared in the manner substantially as described.

In testimony that I claim the foregoing as my own, I affix my signature in presence of two witnesses.

G. W. C. GAMBLE.

Witnesses:
    JAMES B. CARY,
    J. Q. PEPPER.